(12) United States Patent
Kingston-Jones et al.

(10) Patent No.: US 10,577,011 B2
(45) Date of Patent: Mar. 3, 2020

(54) STEERING COLUMN ASSEMBLY (71) Applicant: TRW Limited, Solihull, West Midlands (GB)

(72) Inventors: Harry Kingston-Jones, Steyning (GB); Niclas Davies, Birmingham (GB)

(73) Assignee: TRW Limited, Solihull, West Midlands (GB)

( * ) Notice: Subject to any disclaimer, the term of this patent is extended or adjusted under 35 U.S.C. 154(b) by 120 days.

(21) Appl. No.: 15/556,634

(22) PCT Filed: Mar. 7, 2016

(86) PCT No.: PCT/GB2016/050602
§ 371 (c)(1),
(2) Date: Sep. 8, 2017

(87) PCT Pub. No.: WO2016/142673
PCT Pub. Date: Sep. 15, 2016

(65) Prior Publication Data
US 2018/0057038 A1 Mar. 1, 2018

(30) Foreign Application Priority Data
Mar. 10, 2015 (GB) .................................. 1504034.8

(51) Int. Cl.
*B62D 1/19* (2006.01)
*F16F 7/12* (2006.01)
(52) U.S. Cl.
CPC .............. *B62D 1/195* (2013.01); *F16F 7/123* (2013.01)
(58) Field of Classification Search
CPC .......... B62D 1/19; B62D 1/192; B62D 1/195; F16F 7/12; F16F 7/123
See application file for complete search history.

(56) References Cited

U.S. PATENT DOCUMENTS

| 5,609,364 A * | 3/1997 | Fouquet | B62D 1/195 280/777 |
| 6,322,103 B1 * | 11/2001 | Li | B62D 1/195 280/777 |

(Continued)

FOREIGN PATENT DOCUMENTS

| GB | 2236573 A | 4/1991 |
| JP | H1129049 A | 2/1999 |
| WO | 2014132062 A2 | 9/2014 |

OTHER PUBLICATIONS

Patents Act 1977: Search Report under Section 17(5), Application No. GB1504034.8, dated Aug. 6, 2015.

(Continued)

*Primary Examiner* — Faye M Fleming
(74) *Attorney, Agent, or Firm* — MacMillan, Sobanski & Todd, LLC (57) ABSTRACT

A steering column assembly comprises a first support bracket, a second support bracket, a shroud, and an energy absorbing device. The energy absorbing device comprises a laminated strap having discrete first and second layers, each formed from a separate elongate strip of material that is free to slide over the other strip along a major portion of its length, a portion of the laminated strap being coiled into a spiral, a free end portion of the laminated strap passing through passing through an opening in the second support bracket or the shroud, the free end of a first one of the strips having an opening through which a fastener passes that secures the laminated strap to the first support bracket, and the free end of a second one of the straps being connected to the first strip in a region distal from the free end of the first strip.

10 Claims, 8 Drawing Sheets

(56) References Cited

U.S. PATENT DOCUMENTS

| | | | |
|---|---|---|---|
| 6,454,302 B1* | 9/2002 | Li .......................... | B62D 1/195 |
| | | | 280/777 |
| 6,578,872 B2* | 6/2003 | Duval .................... | B62D 1/195 |
| | | | 280/777 |
| 6,655,716 B2* | 12/2003 | Riefe ..................... | B62D 1/195 |
| | | | 188/374 |
| 7,510,213 B2* | 3/2009 | Manwaring ............ | B62D 1/195 |
| | | | 280/777 |
| 9,365,235 B2* | 6/2016 | Kingston-Jones ..... | B62D 1/195 |
| 2004/0232685 A1* | 11/2004 | Gatti ..................... | B62D 1/195 |
| | | | 280/777 |
| 2006/0273569 A1 | 12/2006 | Manwaring et al. | |
| 2008/0238071 A1* | 10/2008 | Oh ......................... | B62D 1/195 |
| | | | 280/777 |

OTHER PUBLICATIONS

PCT International Search Report and Written Opinion, Application No. PCT/GB2016/050602, dated May 17, 2016.

* cited by examiner

Fig. 10
Embodiment B

Fig. 12

Fig. 8
Embodiment A

Fig. 11
Embodiment C

Fig. 13

STEERING COLUMN ASSEMBLY

CROSS-REFERENCE TO RELATED APPLICATIONS

This application is a national stage of International Application No. PCT/GB2016/050602, filed 7 Mar. 2016, the disclosures of which are incorporated herein by reference in entirety, and which claimed priority to Great Britain Patent Application No. 1504034.8, filed 10 Mar. 2015, the disclosures of which are incorporated herein by reference in entirety.

BACKGROUND OF THE INVENTION

This invention relates to improvements in steering column assemblies of the kind including a support bracket that permits collapse during a crash. It also relates to steering assemblies including a support bracket.

Steering column assemblies for automotive vehicles and the like are increasingly required to be adjustable for steering wheel distance known as reach. This requires the column shroud, within which the steering column shaft attached to the steering wheel is rotatably located, to be fixed to the vehicle by a clamp mechanism which can be locked and unlocked to either prevent or permit adjustment of the column shroud position respectively.

One common arrangement uses a telescopic column shroud which comprises an inner member and an outer member—typically two elongate metal tubes—which slide one inside the other to permit reach adjustment. Fixing rails are provided on one of the tubes and are secured to a first support bracket by a releasable clamp mechanism. The first support bracket is in turn secured to an immobile part of the vehicle chassis, often by securing a-second support bracket to the first support bracket, or to frangible capsules supported by the first support bracket that is, or are, fixed to the vehicle. When the clamp mechanism is clamped the fixing rail and support brackets are fixed relative to one another. When unclamped the-shroud can move relative to the brackets to permit the required reach adjustment.

In the event of a crash it is desirable, and sometimes a legal requirement, for the steering column assembly to collapse in a controlled manner. This helps to reduce the forces of a driver colliding with the steering wheel or its airbag. A steering column which is arranged so that it has movable elements during an accident is known as a collapsible steering column assembly.

In one known arrangement the controlled collapse of a telescopically adjustable steering column assembly is enabled by connecting the first support bracket to the fixed part of the vehicle, and to the second support bracket, using one or more frangible connectors. The shroud is connected to the second support bracket by means of a clamp or fixed in the case of a non-adjustable column. In a crash the forces on the shroud are sufficiently high to cause the frangible connection to break, leaving the shroud and second bracket assembly, and hence an upper part of the steering column, free to move relative to the first support bracket.

To control the movement of the upper column during collapse, some form of energy absorbing device is typically provided that acts between the first support bracket and the vehicle body. The energy absorbing device in use absorbs energy in the event of a collapse of the steering assembly. In this context, a collapse is defined as movement of the shroud beyond its normal range of adjustment due to the application of force through the steering wheel along the axis of the steering column shaft. This will typically arise when the force from a driver's body passes-through the steering wheel in a crash. For a steering column assembly that is adjustable for reach the normal range of adjustment will correspond to the allowable reach adjustment of the steering and this should not be opposed by the energy absorbing device, since that would make the steering difficult to adjust for reach. The energy absorbing device controls the movement of the support bracket.

BRIEF SUMMARY OF THE INVENTION

According to a first aspect the invention provides a steering column assembly comprising:
a first support bracket that is secured to a fixed part of the vehicle,
a second support bracket that is secured to the first support bracket by at least one frangible connector,
a shroud which supports a steering column shaft and can be clamped or otherwise rigidly fixed to the second support bracket, and
an energy absorbing device that acts between the first and the second support bracket and which in the event of a collapse of the steering column assembly deforms so as to absorb energy and thereby at least partially controlling the collapse of the steering column assembly;
in which the energy absorbing device comprises a laminated strap having discrete first and second layers, each layer formed from a separate elongate strip of material that is free to slide over the other strip along a major portion of its length, a portion of the laminated strap being coiled into a spiral, a free end portion of the laminated strap passing through an opening in the second support bracket or the shroud, the free end of a first one of the strips having an opening through which a fastener passes that secures the laminated strap to the first support bracket, and the free end of a second one of the straps being connected to the first strip in a region distal from the free end of the first strip,
whereby in the event of a collapse of the steering column assembly the upper column moves relative to the first support bracket which causes the strap to be pulled through the opening whilst at the same time unwinding the coil, thereby controlling the collapse of the upper column assembly.

The spiral may comprise a planar spiral in which each turn of the spiral is generally in the same plane as the others, i.e. it may be considered to form a substantially flat disk shape before uncoiling.

Providing a laminated strap in which not all of the strips are directly connected to the vehicle, the other strip or strips being secured indirectly to the vehicle through those strips, there is a reduced thickness in the region where the connection is made for a given laminate thickness within the coil. This may make it easier to package. It allows one strap with a consistent thickness to be fixed to the first shroud yet allows alternative unfixed straps with different energy absorption characteristics to be easily interchanged without significant effect on surrounding components. If both were fixed the overall thickness would be the sum of the two straps and would therefore vary. Also, with increasing demands for higher resistance to collapse force requiring a thicker strap, a laminate may be easier to shape and assemble compared with a single thick strap.

The end portion of the first strap that is not in the spiral may be secured to the first support bracket by a fastener that comprises a nut or bolt or screw or rivet or stud. It may be welded or bonded to the bracket.

The fastener that secures the laminate strap to the first (fixed) bracket may be the same fastener that secures the fixed bracket to the vehicle. This allows a reduction in the number of fasteners that are needed to be achieved.

There may be only two strips in the laminate, the first strip and second strip. But there may be three or four or more strips in the laminate, each distinct from the other. This allows the energy absorption characteristics to be tuned to suit the vehicle crash requirements by changing the number of additional strips or the gauge of additional strips or adding cutouts to any of the strips.

There may be a non-coiled portion of the first strip that extends away from the coil, and the second strip may be connected to the first strip at that non-coiled portion. This non-coiled portion may be substantially planar, or may contain one or more kinks. This part may be between but not limited to 10 mm and 50 mm long.

The second strip may be connected to the first strip close to the free end of the first strip, for example between but not limited to 10 mm and 50 mm away from the region where the first strip is secured to the first support bracket.

The first strip and the second strip may be arranged so that the portion of the second strip extending from the end connected to the first strip towards the innermost end inside the spiral is free to slide over the first strip as the coil unwinds. This can be achieved by ensuring they are not connected over this portion. The sliding may be beneficial because of the different radii of the first and second strips within the two spirals.

The second strip may be laid onto the first strip on the inner side of the first strip, by which we mean that the coiled part of the second strip is totally surrounded by the coiled part of the first strip. Or it may be laid onto the first strap on the outer side of coiled part of the first strip.

The end of the second strip may lie outside of the spiral and may be connected to the first strip by a weld, mechanical crimping or interlocking of strips.

At least one of the strips may be provided with one or more axially extending cut outs along the strip within the coiled region to provide a different cross section in the region of a cut out from a region without a cut out, the size and shape and location of the or each cut out enabling the resistance to collapse forces to be tailored as the coils unwinds.

The collapse force can be set by choosing the width and thickness of the strip along its length, the material of the strip and the cross section of the strip and the shape of the coil.

The first strip, and/or the second strip, may include a cut out.

Each of the first strip and the second strip may comprise a thin elongate planar strip which may have a thickness of between 0.3 mm and 2 mm. It may have a thickness but not restricted to of 0.5 mm or 1 mm.

Each of the strips may have a width of between but not restricted 10 mm and 30 mm, for example 20 mm. The width may be substantially constant along the length of the strip.

Each of the first strip and the second strip may be metal or metal alloy and preferably a metal or metal alloy suitable for cold forming. For instance, each strip may comprise a steel strip, such as mild steel, and may for example comprise metal to specification British Standards EN10130 or EN 10139 which is a cold Rolled mild steel, or C390. The material should be ductile, so that when the coil is stretched out it does not try to spring back into the coil shape, and so that energy is expended in straightening the spiral coil.

The two strips may have the same thickness, or they may have different thicknesses. The first strip may be thicker or thinner than the second strap.

The coil may be a tight coil with each of the opposing surfaces of the first strip contacting a face of the second strip throughout substantially the whole of the coiled portion.

The coil may pass through at least two full turns, or at least three or more full turns.

The length of the strip that forms the coil may correspond approximately to the full collapse distance of the steering column assembly. It may be slightly less, a small amount of additional distance being permitted by deformation of the end portions of the device.

The assembly may include one, two or more energy absorbing members, each one passing through a respective opening on the second bracket and being connected to the first bracket using a fastener that secures the first bracket to the vehicle.

The shroud may comprise an upper portion and a lower portion, the upper portion being located an end of the shroud closest to a steering wheel of the steering assembly.

The cross section of the opening in the second bracket through which the strap passes may be generally complimentary to the cross section of the strap, so that the strap can only pass through in an uncoiled state.

The upper portion of the shroud may telescope relative to the lower portion. The lower portion may slide into the upper portion, or the upper portion may slide into the lower portion. This arrangement permits reach adjustment of the steering column assembly. When telescoping the shroud will move relative to the support bracket. Once in a desired position it may be secured using the clamp assembly. In a crash, the clamp assembly remains fixed and to the second support bracket which will move with the shroud once the capsules have been broken.

The invention may be applied to other types of steering column assembly that might not have a telescopic shroud, but may include some other mechanism for permitting collapse when the force from the driver impacts through the steering wheel in an accident, such as a shroud that can deform or otherwise move relative to the vehicle.

The fixed first support bracket may be secured to the vehicle body using the same fastener(s) that secure the strap to the bracket, or separate fasteners. The fixed bracket could, for instance, form an integral part of the vehicle body, such as a part of a cross beam located behind a dashboard of the vehicle.

The second support bracket may be an integral part of the shroud. Alternatively it may be distinct from the shroud and secured to the shroud through a clamp mechanism that permits reach adjustment of the shroud. The clamp mechanism may include a bolt that passes through openings in the shroud and the bracket. Where the shroud is movable relative to the bracket for reach, it is preferred that the openings that the energy absorbing means pass through are part of the second support bracket.

The invention may also provide in another aspect an energy absorbing device having any of the features described above.

The energy absorbing device may comprise a laminated strap having discrete first and second layers, each layer formed from a separate elongate strip of material that is free to slide over the other strip along a major portion (the active portion) of its length, the laminated strap being coiled into a planar spiral around an innermost end of both of the elongate strips, a free end portion of the laminated strap extending away from the spiral and including an opening through which a fastener may be passed when in a position of use, the free end of a second one of the strips being connected to the first strip in a region distal from the free end of the first strip, The energy absorbing member of the invention may be formed by shaping each strip independently, placing them alongside one another so they lie in parallel spaced planes, and then pressing the two formed strips together to form the laminate in a single plane.

Protection for a method of assembling a strap may therefore be sought through this application.

Other advantages of this invention will become apparent to those skilled in the art from the following detailed description of the preferred embodiments, when read in light of the accompanying drawings.

DETAILED DESCRIPTION OF THE INVENTION

Figure 1:
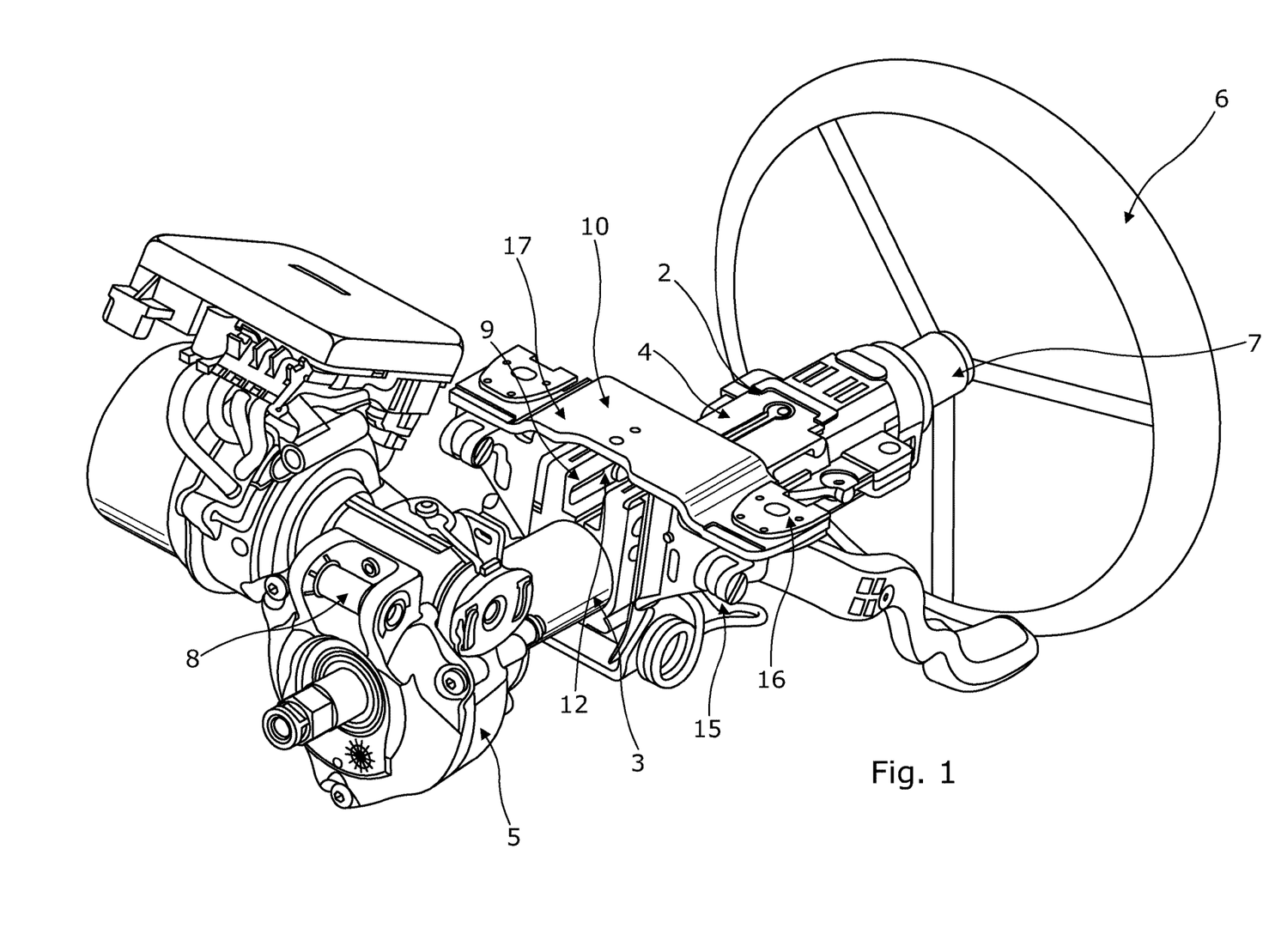
FIG. 1 is a view of steering column assembly in accordance with the present invention in an un-collapsed position.
Figure 2:
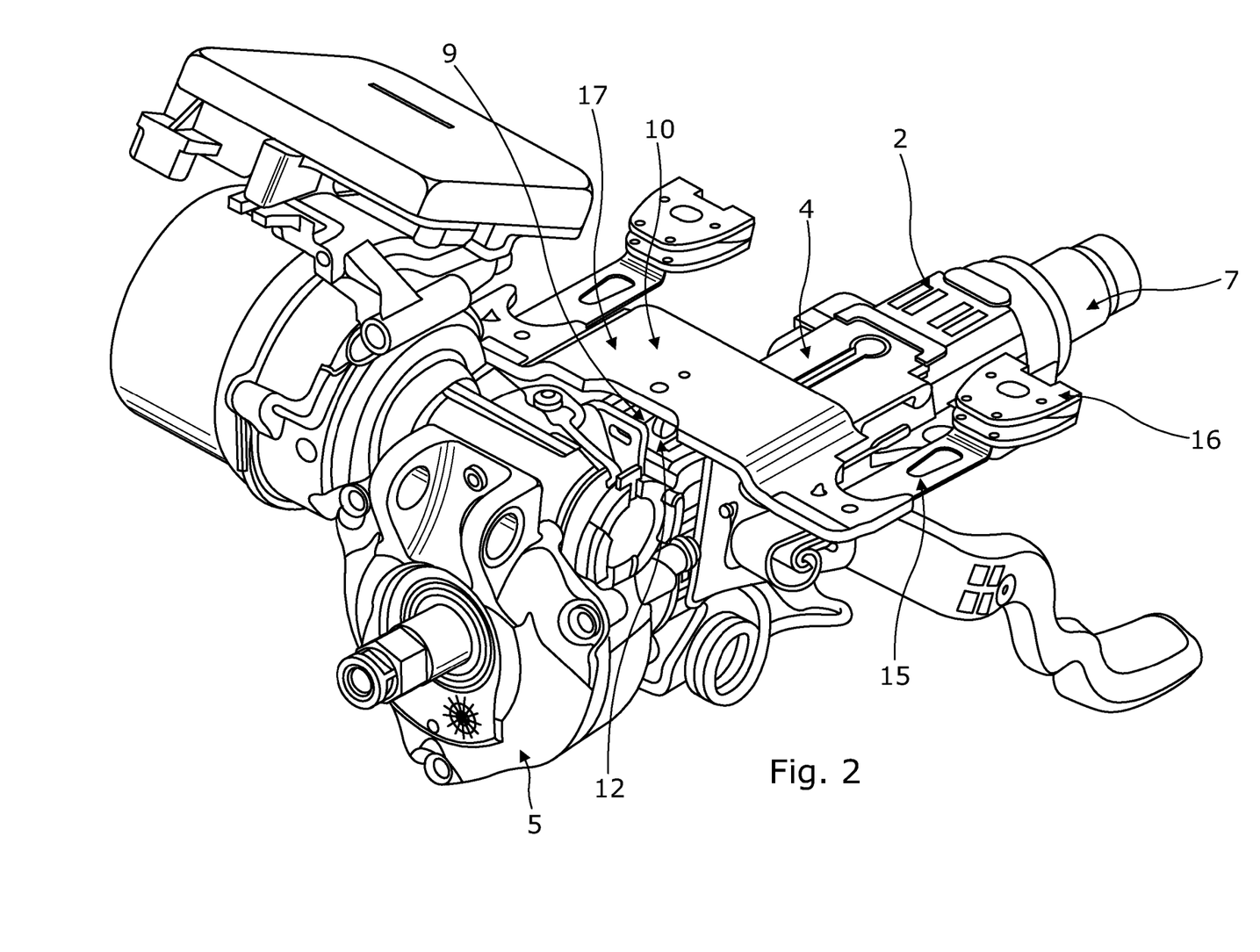
FIG. 2 is a perspective view of a support bracket, frangible capsules and energy devices of the steering column assembly of FIG. 1.

As shown in FIG. 1 a steering column assembly 1 comprises a telescopic steering column shroud 2 comprising an inner member 3 and an outer member 4 which receives a portion of the inner member. The inner and outer members 3, 4 are metal tubes with the inside diameter of the outer member 4 being only slightly greater than the outside diameter of the inner member 3 so as to permit relative movement between them by sliding. In the example of FIG. 1 the inner member 3 is attached to gearbox housing 5 whilst the outer member 4 extends away from that towards a steering wheel 6. This housing 5 may contain a gearbox in the case of an electric power steering system which is driven by an electric motor to provide an assistance torque. This tube in tube combination can also be reversed so the large tube is adjacent to the housing 5.

The steering wheel 6 is supported by a telescopic steering shaft 7 that is free to rotate within the steering column shroud 2. An example could be a bush (not shown) of low friction material such as a plastic is located between the inner and outer members 3, 4 to control the friction that is generated when the two are moved over one another to extend or collapse the steering column either when adjusting reach of the steering wheel 6 or in an accident.

The steering column shroud assembly 1 which may include a gearbox 5 at in the case of an electric power steering system is fixed pivotally to a part of the vehicle body at an axis 8 distal from the steering wheel 6. At a position closer to the steering wheel than this axis it is also fixed by a clamp mechanism 9 to a support bracket assembly 17 which is typically secured to the body of the vehicle by two or more vertical fasteners 11.

The support bracket assembly 17 is bolted in place in a region under the dashboard and the clamp mechanism clamps the shroud to the support bracket assembly 17 at a point 12 somewhere between the pivot axis and the steering wheel. The clamp mechanism can be locked or unlocked to allow the rake of the steering column 1 to be adjusted by pivoting about the pivot axis 8. In the case of the column 1 shown in FIG. 1 the reach position of the steering wheel 6 can also be adjusted through the provision of longitudinal slots in the clamping rails 9 which are attached to the outer shroud member. When locked the steering column 1 cannot be moved other than in an accident where it can collapse as described below.

The support brackets can take many forms. In the example shown in FIG. 1 a support bracket 10 is clamped to the shroud and can be considered to be a part of the shroud. The bracket is securely fixed to the vehicle by a pair of frangible capsules 16.

The second support bracket 10 is in the form of a metal sheet pressed into an inverted U-shape lying in a generally horizontal plane above the steering column shroud (not shown). Two arms of the U-shaped bracket 10 depend downwards in a generally vertical plane and extend down either side of fixing rails which are welded or are in some other way attached to the outer shroud member 9. The arms comprise two spaced vertical walls attached to the outer tube on opposing sides of for example an elongate slot 13 (not visible).

A clamp mechanism (not shown) acts between the two arms of the U-shaped second bracket 10 to draw them together when locked so that they squeeze the walls of fixing rails. Many different types of clamp mechanism are known and so no further description is needed here. In one suitable arrangement shown in this embodiment the clamp mechanism includes a clamp pin that passes through elongate slots in the rail and the arms of the bracket to permit reach and rake adjustment. The steering column 1 perhaps only be adjustable for reach or rake, and the invention could even be applied to a steering column 1 which is not adjustable for reach or rake. If it is not adjustable for either reach or rake the clamp mechanism does not need to be adjustable in use and could merely provide a permanent connection of the shroud (not shown) to the U-shaped bracket 10.

Two wings 19 extend horizontally outwards from the two arms, one from each arm. Each wing includes a female profile cut inward from one edge into which a frangible capsule 16 is received. This is shown in more detail in FIG. 3 of the drawings.

Figure 3:
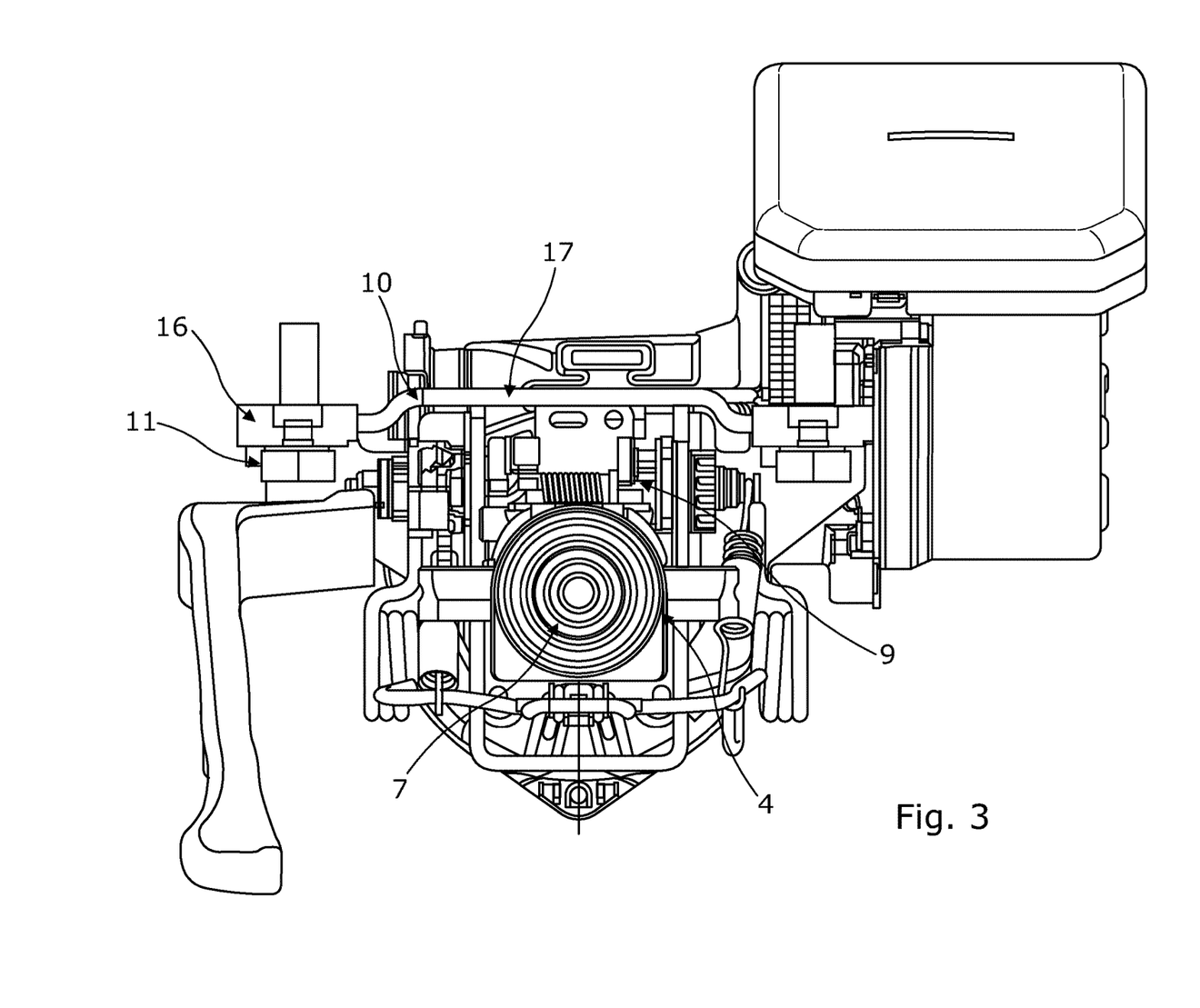
FIG. 3 is an enlarged view of one of the capsules and energy absorbing devices secured to the bracket.

Each capsule 16 comprises a main body part that is cast or machined in the form of two larger plates between which is sandwiched a small central portion. The profile cut out from the first bracket part is typically designed to be a close fit to a corresponding male profile of the cut-out which is formed in the central portion of the capsule. After assembly of the capsule 16 to the wing 19 of the second bracket part 10, a frangible material such as a plastic is injected through holes 20 in the first support bracket part or the capsule 16 which are co-axial. There may be more than one group of such coaxial holes. Once set, the plastic acts as a fusible dowel which is designed to shear when the said prescribed level of force is applied. In this embodiment the plate thickness of the wing of the support bracket part is slightly less than the gap between the upper and lower plate portions of the capsule so that a proportion of the injected plastic spreads into the said gap and improves the stiffness of the connection between the capsule 16 and the second bracket part 10.

The fusible capsule 16 defines an anchor point for a fastener 11 which allows the first support bracket part to be rigidly fixed to the vehicle. A hole is provided in the capsule 16 which receives the fastener, in this example a bolt. In a crash where a driver is thrown against the steering wheel (not shown), the force causes the steering shaft and shroud to collapse. This leads to a force being applied through the support bracket 10 by the clamp assembly along the axial direction of the shroud. If this force is sufficiently high it will break the frangible capsule 16 allowing the bracket 10 to move away from the capsule 16 and thus move relative to the vehicle body.

To control the movement of the shroud after the capsules 16 have broken the apparatus further includes two energy absorbing devices 15. The devices are identical in this embodiment and so only one device will be described in detail.

As shown in FIGS. 4 to 12 the energy absorbing devices 15 may have slight variations in shape in different embodiment but in each case comprise a laminated strap that is coiled into a planar spiral. The laminated strap therefore has an inner most end within the coil, winds around that end at an increasing distance from the centre (when looking along any line that radiates from the centre) and terminates at a free end that is spaced from the coil by a generally linear uncoiled portion. The generally linear portion includes an optional stepped portion or kink.

The energy absorbing member 15 is located so that the generally linear portion between the free end and the coil passes through a slot in the wing of each arm. The free end of the laminated strap (on the opposite side of the opening to the coil) is connected to the fixed bracket by the same connector that secures the frangible capsule. The opening is sized so that the strap can only fit through in an uncoiled state. Thus, the diameter of the coil is greater than the depth of the slot, which in practice is only slightly larger than the strap that passes through it.

The coil has at least two full turns, and each turn or winding of the coil lies in the same plane as the other turns. As shown this plane is parallel to the axis of the shroud and vertical, although it could be non-vertical.

In the event of a crash causing the capsules to break, the shroud and the first bracket will move away from the driver. The capsules will stay in position relative to the vehicle body. This movement is resisted by the coil pressing onto the arm. As the force increase the shroud will start to move causing the kink to straighten. As it moves further, the strap will be pulled through the slot causing the coil to unwind as the side of the opening pushes against the surface of the coil.

Figure 4:
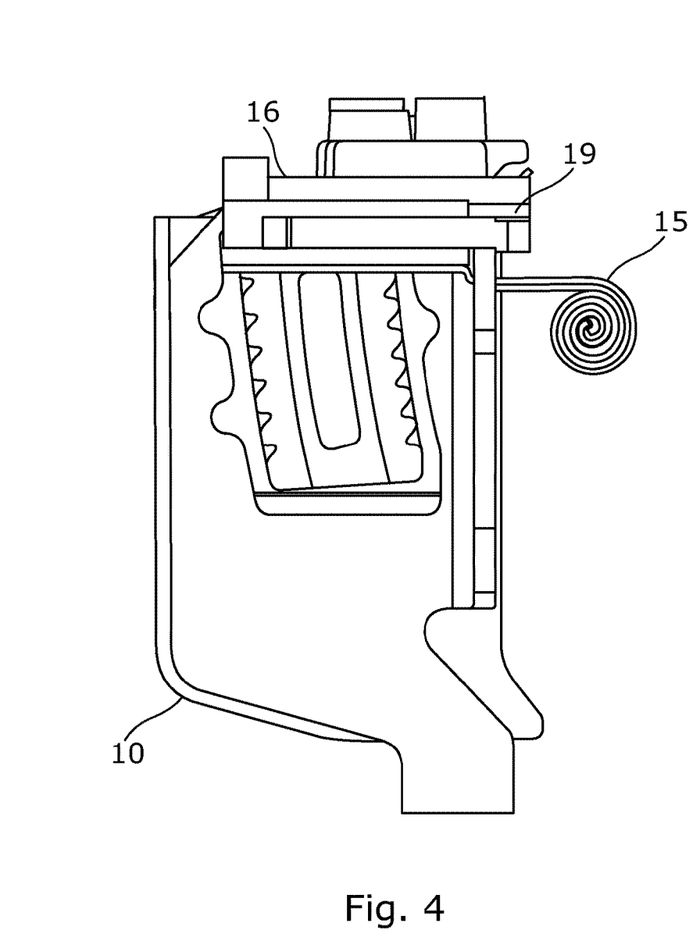
FIG. 4 is a side view of a portion of the assembly including the support brackets, one of the capsules and one of the energy absorbing devices (the others being obscured) but with the shroud omitted, in a condition prior to a collapse
Figure 5:
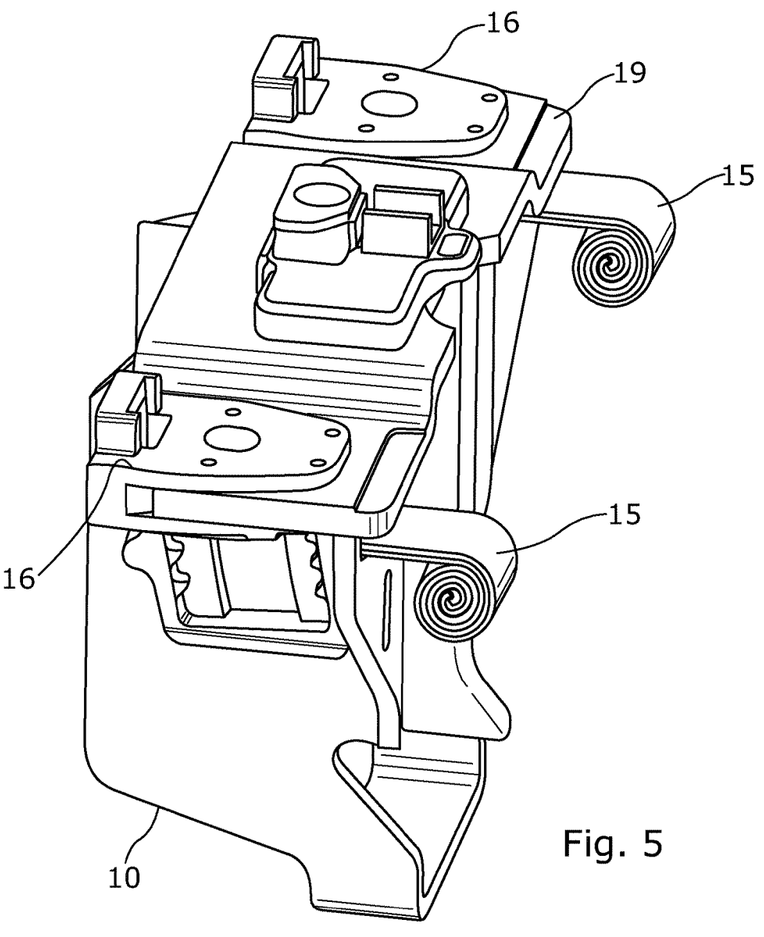
FIG. 5 is a perspective view corresponding to FIG. 4.
Figure 8:
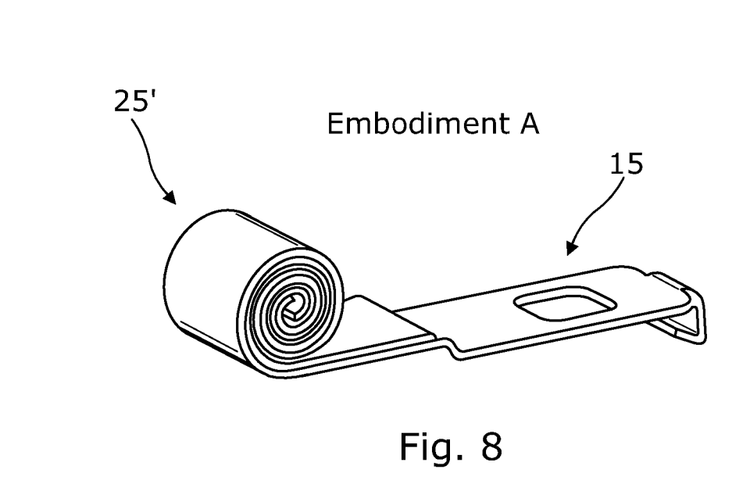
FIG. 8 is a perspective view of a first embodiment A of a laminated strap.

A first exemplary energy absorbing device 15 is shown in FIGS. 8, 4 and 5 of the drawings. The energy absorbing device 15 comprises a pair of elongate strips 22,23 laid one on top of the other as a laminate, a first one 22 with a thickness of around 1 mm and a width of around 20 mm, and a second one with a thickness of around 0.5 mm and a width of around 20 mm. The strips 22, 23 are in register meaning that the long edges are aligned along the length of the strips. The second strip 23 is slightly shorter than the first strip 22 so that there is a portion 24 of the first strip, at its free end, that is not overlaid by the second strip. Both strips 22, 23 are wound into a spiral 25 and the innermost ends 26 of the strips, with the spiral formed by the second strip interleaved with the coil of the first strip. Both coils are in the same plane. The width and thickness are uniform along the whole length of the strip, although in some arrangements the thickness and/or width may vary.

Two free end portions of each strip of between 20 mm and 50 mm or so in length project away from the spiral portions 25 of the laminated strap, the end portion of the second strip being shorter than the end portion of the first strip so that the free end of the second strip connects to the first strip a distance from the free end of the first strip. The connection 27 is made by a weld.

The free of the first strip 22 includes an opening 28 through which the fastener 11 passes. Because the fastener 11 does not pass through the second strip, then the difficulties of accommodating a much thicker strap are avoided.

Figure 6:
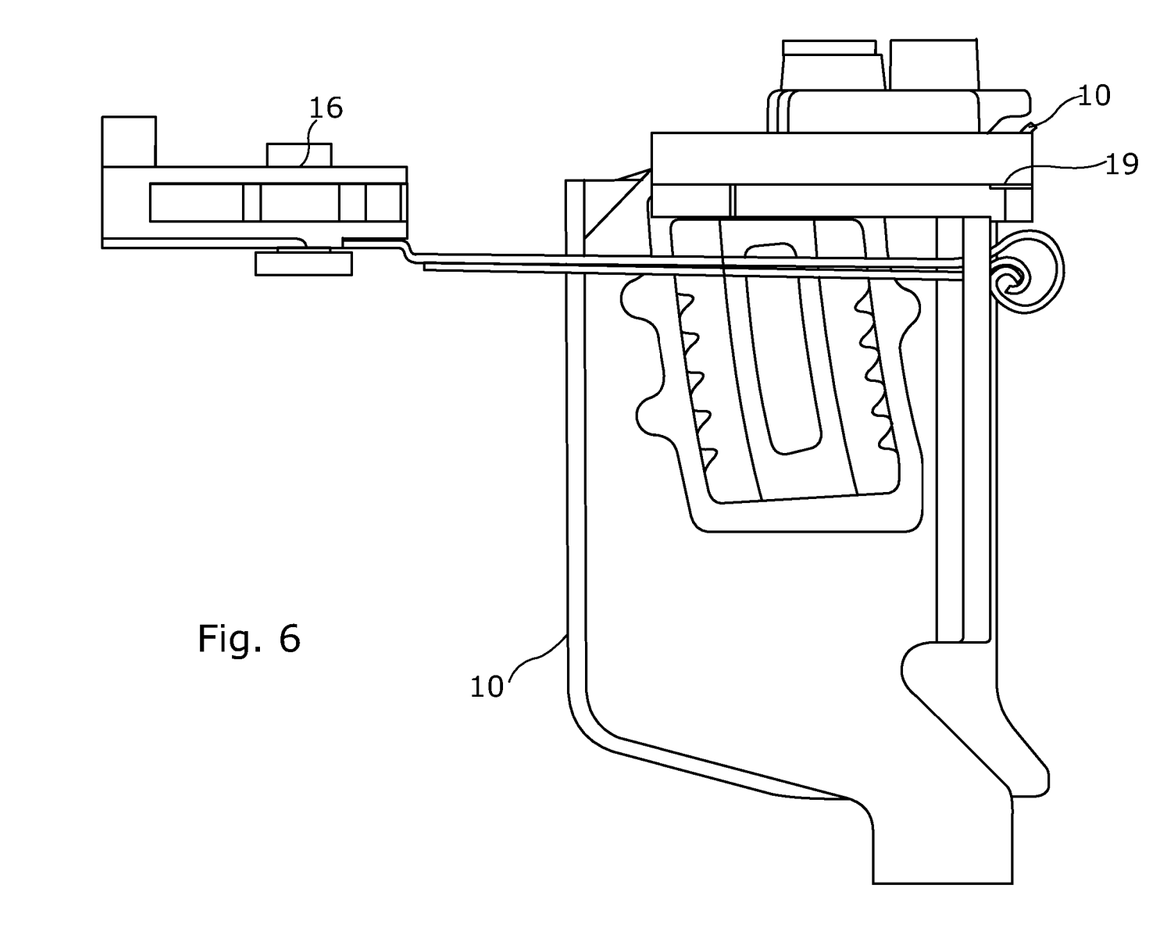
FIG. 6 is a side view of a portion of the assembly including the support brackets, one of the capsules and one of the energy absorbing devices (the others being obscured) but with the shroud omitted, in a condition after a full collapse following a crash.
Figures 7, 9:
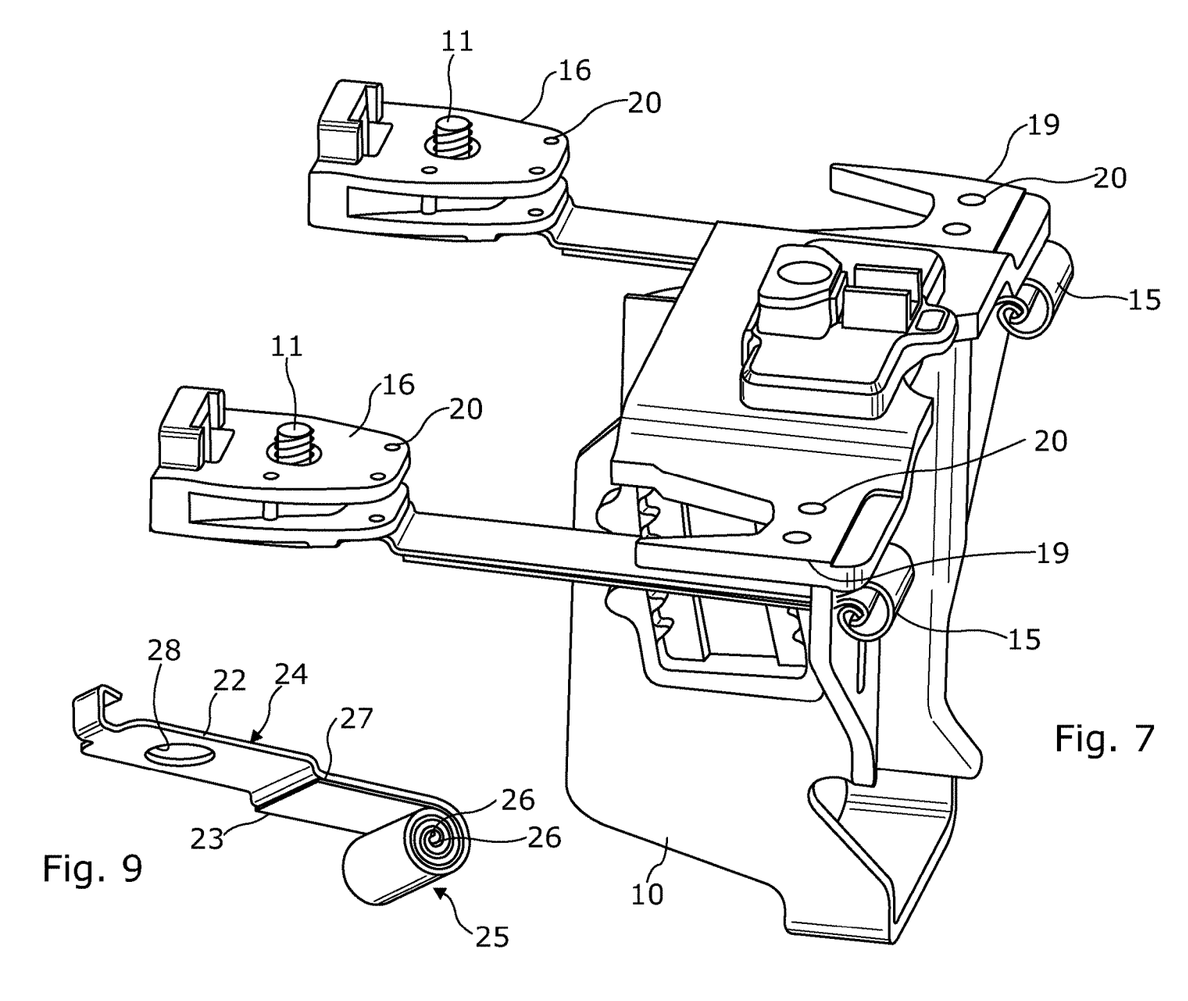
FIG. 7 is a perspective view corresponding to FIG. 6.
FIG. 9 is a corresponding view of a modified form of embodiment A in which the straps have different thicknesses.

FIGS. 4 and 5 show the assembled laminated strap 15 before collapse, and FIGS. 6 and 7 show the coiled strap after a full collapse where the coil has unwound.

In an alternative arrangement of energy absorbing member 15' shown in FIG. 9, the second strip 23' is the same thickness as the first strip 22'. As shown the first strip is substantially 1 mm thick and second 0.5 mm thick.

Figure 10:
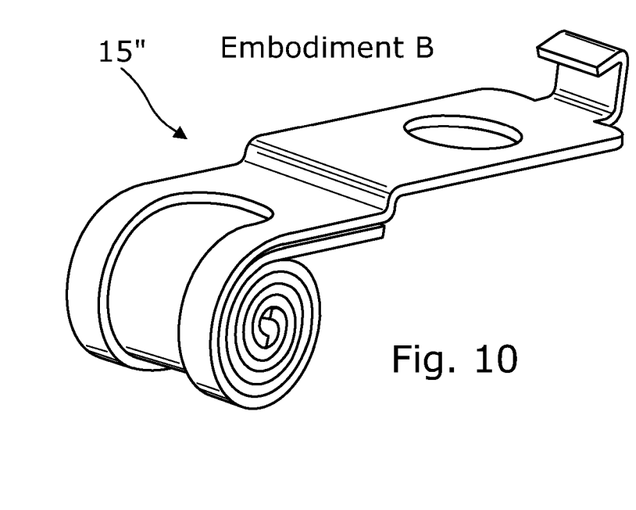
FIG. 10 is a perspective view of a second embodiment B of a laminated strap.

In another alternative of an energy absorbing device 15", shown in FIG. 10, the first strip 22" is provided with an elongate axial cut-out 29 that extends along the coiled portion 25" between the free end of the first strip and the innermost end. The second strip 23" has no such cut out. Again, the first strip is thicker than the second strip but they could be the same thickness or the second strip thicker than the first.

Figure 11:
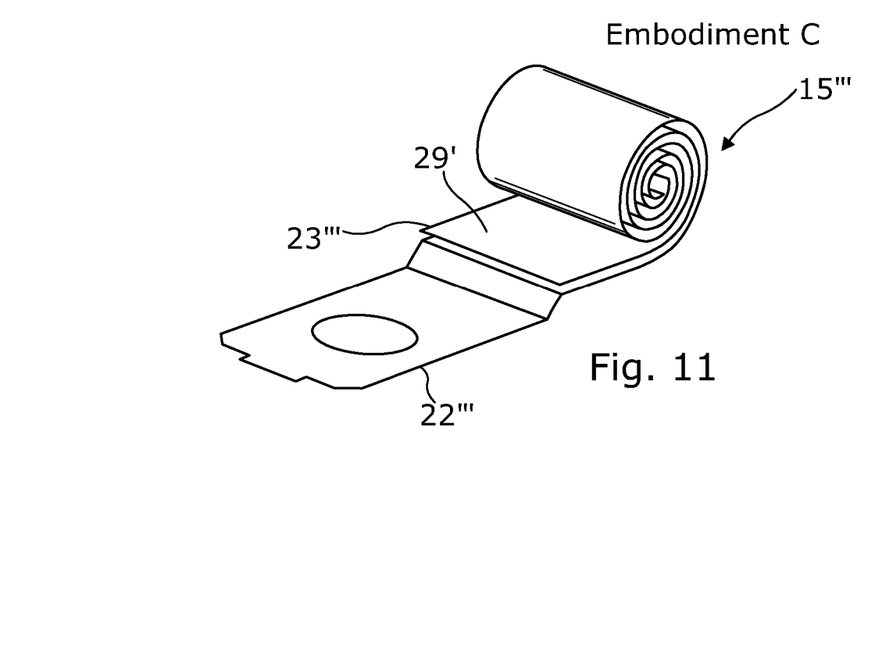
FIG. 11 is a perspective view of a third embodiment C of a laminated strap.
Figure 12:
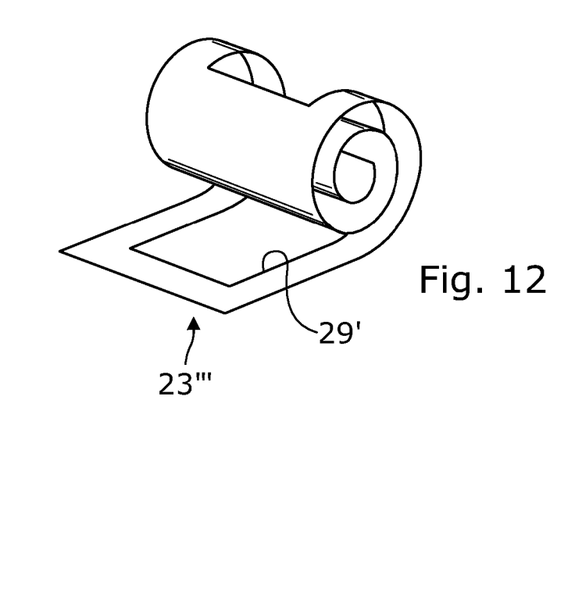
FIG. 12 shows the second strip of the strap of embodiment C with the first strip omitted for clarity.

In a further alternative, shown in FIGS. 11 and 12, the first strip 22''' does not have a cut out along the coiled portion but the second strip 23''' does have an elongate cut out 29'. The two strips in this example are of the same thickness, substantially 1 mm, but could be of differing thickness.

Figure 13:
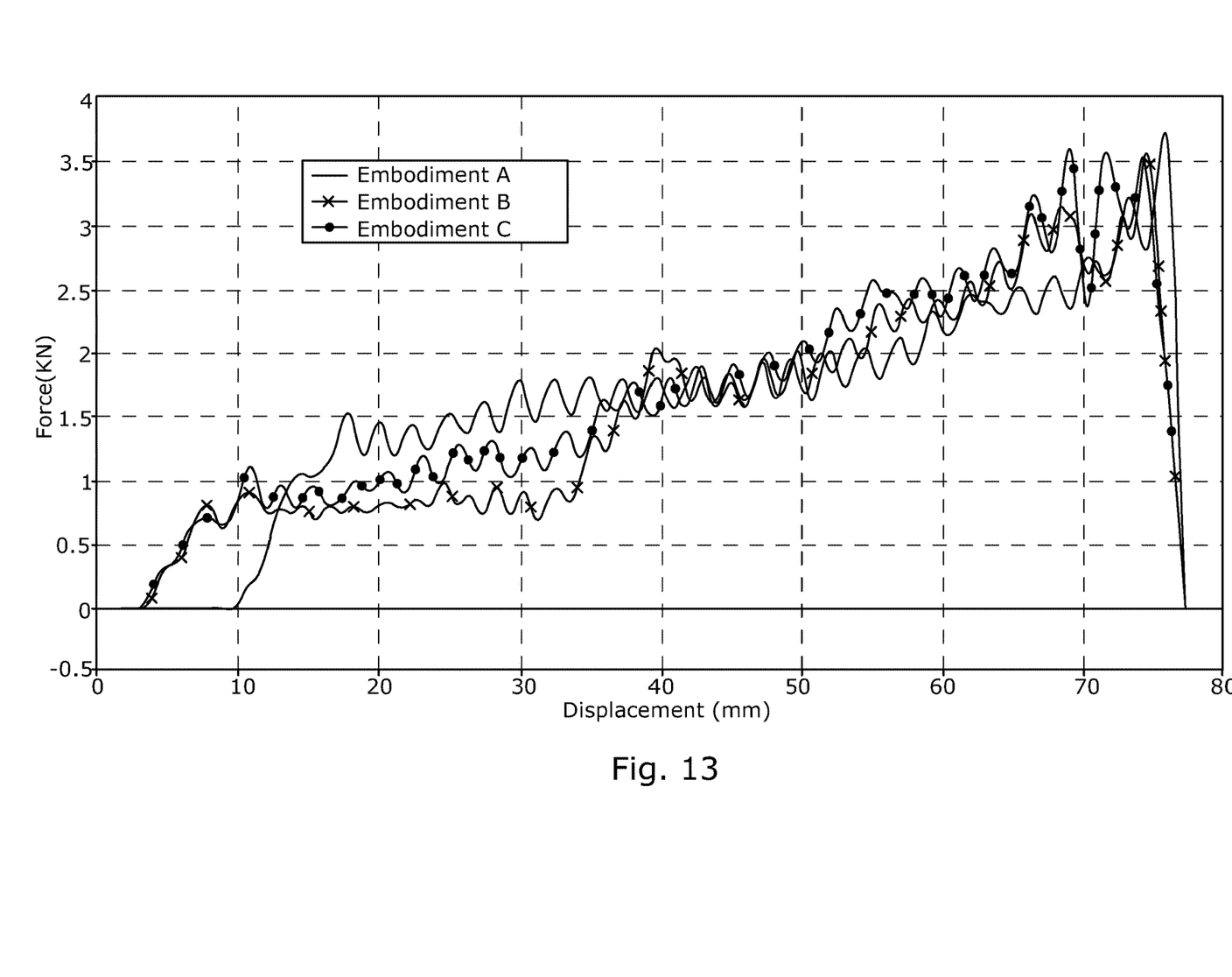
FIG. 13 a plot showing the force absorbed by the steering column assembly against displacement during collapse for the three embodiments A, B and C of differently dimensioned energy absorbing devices.

Varying the thickness and cross section, by using cut-outs 29, 29', enables the resistance of the energy absorbing members to a force trying to uncoil the coil to be controlled. FIG. 13 shows the force against displacement for the three embodiments of FIGS. 9 to 12.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A steering column assembly comprising:
   a first support bracket that is secured to a fixed part of the vehicle,
   a second support bracket that is secured to the first support bracket by at least one frangible connector, a shroud which supports a steering column shaft and can be clamped or otherwise rigidly fixed to the second support bracket, and an energy absorbing device that acts between the first and the second support brackets and which in the event of a collapse of the steering column assembly deforms so as to absorb energy and thereby at least partially controlling the collapse of the steering column assembly;

in which the energy absorbing device comprises a laminated strap having discrete first and second layers, each layer formed from a separate elongate strip of material that is free to slide over the other strip along a major portion of a length thereof, a portion of the laminated strap being coiled into a spiral, a free end portion of the laminated strap passing through an opening in the second support bracket or the shroud, the free end of a first one of the strips having an opening through which a fastener passes that secures the laminated strap to the first support bracket, and the free end of a second one of the strips being connected to the first strip in a region distal from the free end of the first strip, whereby in the event of a collapse of the steering column assembly an upper column assembly moves relative to the first support bracket which causes the laminated strap to he pulled through the opening whilst at the same time unwinding a coil, thereby controlling the collapse of the upper column assembly.

2. The steering column assembly according to claim 1 in which the spiral comprises a planar spiral.

3. The steering column assembly according to claim 1 in which the free end of the first strap that is not in the spiral is secured to the first support bracket by a fastener that comprises at least one of a nut, a bolt, a screw, a rivet, and a stud.

4. The steering column assembly according to claim 1 in which the fastener that secures the laminated strap to the first support bracket also secures the first support bracket to the vehicle.

5. The steering column assembly according to claim 1 in which there are only two strips in the laminated strap, the first strip and second strip.

6. The steering column assembly according to claim 1 which includes a non-coiled portion of the first strip that extends away from the coil, and the second strip is connected to the first strip at the non-coiled portion.

7. The steering column assembly according to claim 1 in which the first strip and the second strip are arranged so that the portion of the second strip extending from the free end connected to the first strip towards the innermost end inside the spiral is free to slide over the first strip as the coil unwinds.

8. The steering column assembly according to claim 1 in which at least one of the strips is provided with one or more axially extending cut outs along the strip within the coiled region to provide a different cross section in the region of a cut out from a region without a cut out.

9. The steering column assembly according to claim 1 in which the coil is a tight coil with each of the opposing surfaces of the first strip contacting a face of the second strip throughout substantially the whole of the coiled portion.

10. The steering column assembly according to claim 8 wherein a size and shape and location of the or each cut out enabling the resistance to collapse forces to be tailored as the coils unwinds.

* * * * *

UNITED STATES PATENT AND TRADEMARK OFFICE
CERTIFICATE OF CORRECTION

PATENT NO. : 10,577,011 B2
APPLICATION NO. : 15/556634
DATED : March 3, 2020
INVENTOR(S) : Kingston-Jones et al.

Page 1 of 1

It is certified that error appears in the above-identified patent and that said Letters Patent is hereby corrected as shown below:

In the Claims

Column 9, Claim 1, Line 26, change:
"laminated strap to he"
To:
--laminated strap to be--

Signed and Sealed this
Twenty-ninth Day of December, 2020

Andrei Iancu
*Director of the United States Patent and Trademark Office*